United States Patent [19]
Shelby et al.

[11] 3,938,851
[45] Feb. 17, 1976

[54] RECOIL MECHANISM

[75] Inventors: Robert L. Shelby, Chillicothe; Eldon D. Oestmann, Washington, both of Ill.

[73] Assignee: Caterpillar Tractor Co., Peoria, Ill.

[22] Filed: Sept. 19, 1974

[21] Appl. No.: 507,264

[52] U.S. Cl................................. 305/10; 213/43
[51] Int. Cl.².......................................... B62D 55/30
[58] Field of Search.......... 305/10, 22; 74/242.1 FP, 74/242.14 R; 213/43; 267/34, 64 A

[56] References Cited
UNITED STATES PATENTS

| | | | |
|---|---|---|---|
| 3,456,764 | 7/1969 | Myers | 213/43 |
| 3,525,449 | 8/1970 | Zanon | 213/43 |
| 3,645,586 | 2/1972 | Piepho | 305/10 |
| 3,692,368 | 9/1972 | Alexander | 305/10 |
| 3,792,910 | 2/1974 | Kaufman | 305/10 |
| 3,829,172 | 8/1974 | Oestmann | 305/10 |

FOREIGN PATENTS OR APPLICATIONS

| 1,158,379 | 11/1963 | Germany | 305/10 |
|---|---|---|---|

*Primary Examiner*—Philip Goodman
*Assistant Examiner*—John A. Carroll
*Attorney, Agent, or Firm*—Phillips, Moore, Weissenberger Lempio & Strabala

[57] ABSTRACT

A tractor recoil mechanism for maintaining tension of the track includes a cylinder having a sleeve piston movably disposed therein, associated with a rear frame portion. A rod member, disposed within the sleeve piston to form therewith a closed chamber with the cylinder means, extends through an open end of the cylinder means. A helical spring acts between the sleeve piston and reaction means associated with a front frame portion to urge them apart. Recoil movement of the front portion in one direction relative to the rear portion moves the rod therewith, so that, with the chamber filled with incompressible fluid, the sleeve piston moves in the opposite direction relative to the cylinder means, with compressive movement of the helical spring being greater than the amount of movement of the front portion toward the rear portion. Vent means associated with the chamber allow introduction of substantially incompressible fluid therein while air may be properly vented therefrom.

9 Claims, 4 Drawing Figures

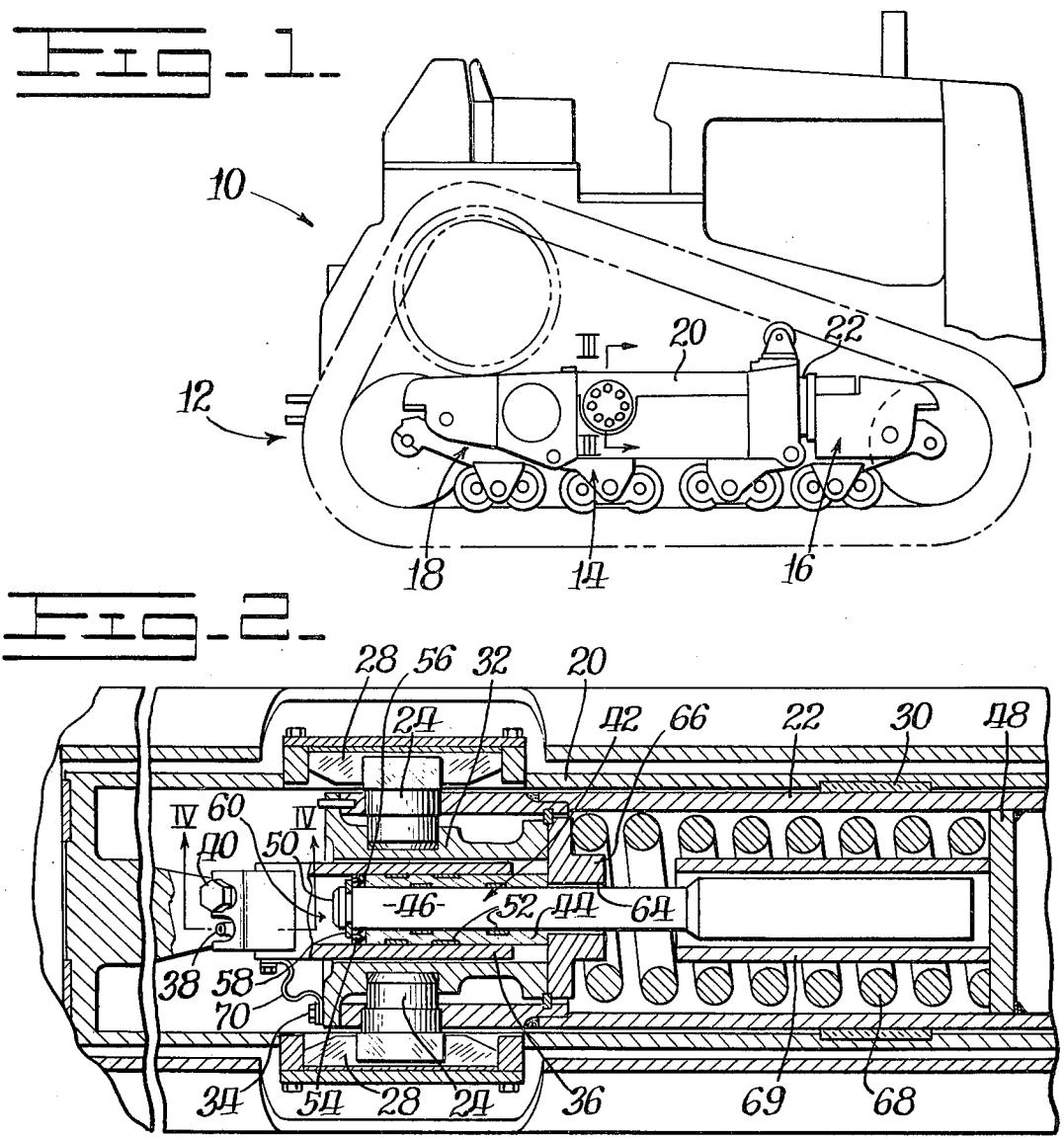
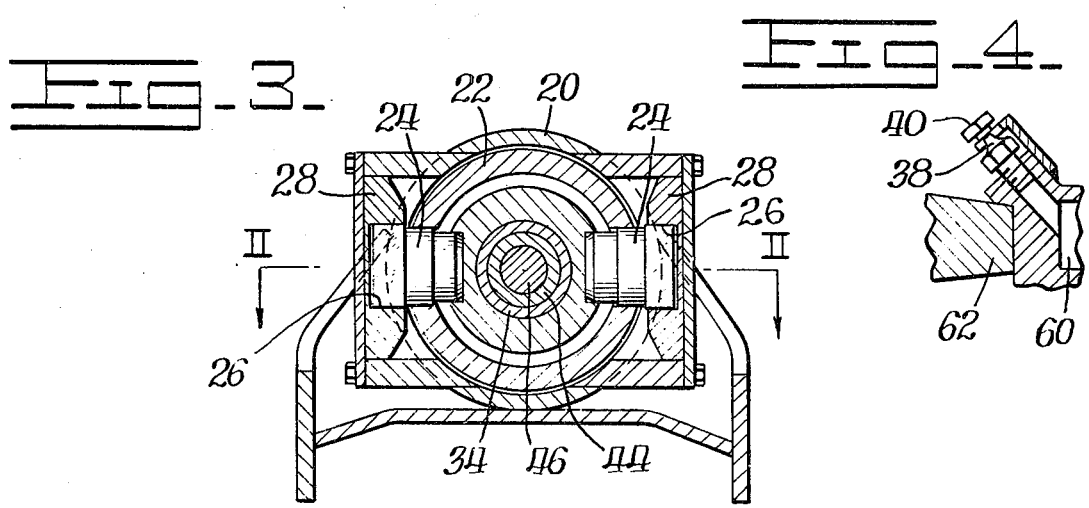

RECOIL MECHANISM

BACKGROUND OF THE INVENTION

This invention relates to track tensioning and recoil systems, and more particularly, to such a system which utilizes cylinder means and a sleeve piston associated therewith for movement therein.

In track-type vehicles, it is well known to provide movement of a front idler toward and away from a rear drive member so that (i) the track entrained thereabout may be properly tensioned between the front idler and the rear drive member and/or (ii) recoil of the front idler may be allowed. In a conventionally designed vehicle, recoil is allowed by means of a resilient spring which is compressed at the same rate of movement as the actual recoil movement of the front idler toward the rear rotatable member (see, for example, U.S. Pat. No. 2,887,342 to Helsel). While such systems are generally effective, it is to be noted that, because spring compression movement is equal to recoil movement, a relatively large, stiff spring must be used (i.e., if spring travel could be designed as greater than the corresponding amount of recoil movement, a smaller, less stiff, and consequently less expensive spring, with greater impact load recoil capacity, could be used).

Examples of systems which achieve different rates of movement are shown in U.S. Pat. No. 3,493,124 to Thompson, U.S. Pat. No. 3,574,418 to Okabe, and U.S. Pat. No. 3,539,229 to Scully. However, it is to be noted that the Thompson device achieves less spring compression than the corresponding recoil movement, so that, for good performance, a very stiff, heavy spring would have to be used in this place, which is exactly the opposite of the aim of this invention.

The Okabe and Scully devices do indeed provide greater spring movement than the corresponding recoil movement. However, the Okabe device achieves this by use of an annular ring-type piston, which requires sealing on both the inner and outer surfaces thereof, and in addition may be subject to possible skewing, since such piston is of relatively large diameter. And the Scully device includes a wall with a valve therein preventing compression of the spring until a certain, predetermined pressure on the valve is achieved.

Of more general interest in this area is U.S. Pat. No. 3,343,889 to Bexten.

U.S. Pat. No. 3,829,172, assigned to the assignee of the present invention, discloses a system which achieves greater spring compressive movement than the corresponding amount of recoil of the front track frame portion toward the rear track frame portion. Such system utilizes a pair of pistons of different diameter, each sealingly engaged in a bore of a member, and such member and pistons together define a chamber within which substantially incompressible fluid is disposed. While such a system has proved relatively effective in operation, it will be understood that improvement in the operating efficiency and design of such a structure are always being sought, especially in view of the fact that each piston of that patent must be sealingly associated with such member with which it is slidably associated.

SUMMARY OF THE INVENTION

It is accordingly an object of this invention to provide, in a track-type vehicle or the like, track-tensioning and recoil means incorporating recoil spring means which provide, upon such recoil, greater spring movement than actual recoil.

It is a further object of this invention to provide, in a track-type vehicle or the like, track-tensioning and recoil means which, while fulfilling the above object, allow recoil operation freely and properly under all conditions.

It is a still further object of this invention to provide, in a track-type vehicle or the like, track-tensioning and recoil means which, while fulfilling the above objects, allows proper and convenient tensioning of the track.

It is still further object of this invention to provide, in a track-type vehicle or the like, track-tensioning and recoil means which are extremely simple in design and manufacture.

Broadly stated, the invention is in combination with first and second members generally reciprocable so as to be movable in one and to the other directions relative to each other. Such invention comprises recoil means comprising cylinder means associated with the first member and movable therewith upon relative movement between the members in one direction, the cylinder means having an open end, and a sleeve piston disposed within the cylinder means and movable therein. A rod member is disposed within the sleeve piston and extends inwardly of the cylinder means through the open end of the cylinder means, the cylinder means, rod member and sleeve piston forming a substantially closed chamber in which substantially incompressible fluid may be disposed. Reaction means are associated with the second member for movement therewith. The rod member is movable with the second member upon relative movement between the members in the one direction. Compressible and extensible resilient means are associated with the sleeve piston and reaction means to urge them apart. With the chamber substantially filled with substantially incompressible fluid, movement of the rod member with the second member, upon relative movement between the members in such one direction, inwardly of the cylinder means, moves the sleeve piston relative to the cylinder means directionally opposite the movement of the rod member relative to the cylinder means, whereby, upon the relative movement of the first and second members in such one direction, the amount of compressing movement of the resilient means is greater than the corresponding amount of relative movement of the first and second members in such one direction.

BRIEF DESCRIPTION OF THE DRAWINGS

These and other objects of the invention will become apparent from a study of the following specification and drawings, in which:

FIG. 1 is a side elevation of a vehicle incorporating the present inventive track-tensioning and recoil system;

FIG. 2 is a view mainly in section taken along the line II—II of FIG. 3;

FIG. 3 is a sectional view taken along the line III—III of FIG. 1; and

FIG. 4 is a sectional view taken along the line IV—IV of FIG. 2.

DESCRIPTION OF THE PREFERRED EMBODIMENT

Shown generally in FIG. 1 is a track-type vehicle 10 having track assemblies on either side thereof, one of which is shown at 12. Such track assembly 12 includes a track frame 14 made up of a first, or rear track frame portion 18, and a second, or front track portion 16. The track frame portion 18 comprises a tubular body member 20, and the track frame portion 16 comprises a tubular body member 22, disposed within the tubular body member 20. The members 20,22 are generally reciprocable relative to each other through the use of oppositely extending trunnions 24 fixed relative to the member 22 and mating and engaging with slots 26 defined by covers 28 which are included as a part of the member 20. Forward bearings are included at 30 for further aiding in the guiding of such reciprocal movement.

An additional cylinder 32 is secured to the member by means of a plurality of bolts 34. Such cylinder aids in supporting the trunnions 24.

A cylinder 36 has fitting 38 fixed thereto through which substantially incompressible fluid may be introduced to within the cylinder 36, and fitting 40 fixed thereto through which pressure within such cylinder may be vented therefrom. The cylinder 36 has an open end 42, and slidably disposed within the cylinder 36 to be movable therein is a sleeve piston 44. A rod member 46 extends inwardly of the cylinder 36, from adjacent a reaction member 48 fixed relative to the member 22, and extends through the open end 42 of the cylinder 36. The end 50 of the rod member 46 within the cylinder 36 extends through and from the sleeve piston 44. Bearings are provided as shown at 52 to allow such relative sliding as described above.

A single annular resilient double-faced seal 54 is disposed about the rod member 46 within the cylinder 36, for providing sealing between the rod member 46 and cylinder 36. The annular seal 54 contacts the annular end face 56 of the sleeve piston 44 as shown, and is retained thereon by means of a snap ring 58 disposed adjacent the end 50 of the rod member 46. It will be seen that the rod member 46, sleeve piston 44, and cylinder 36 together form a substantially closed chamber 60 into which the substantially incompressible fluid described above may be introduced. Upon such introduction of such substantially incompressible fluid through the fitting 38, pressure within the chamber 60 serves to extend the rod member 46 to contact the reaction member 48, and the rear of the cylinder 36 contacts a projection 62 defined by the member 20, so that the member 20 and member 22 are urged apart to properly tension the track. It is to be noted that, with the apparatus disposed in its operating position, the inlet fitting 38 and vent fitting 40 are positioned elevationally above the chamber 60. Such positioning is chosen so that, upon introduction of substantially incompressible fluid into the chamber 60, air within the chamber 60 may be properly released therefrom, and will not be trapped within the chamber 60 to detrimentally effect operation of the system.

The rod member 46 extends through an aperture 64 in an annular flange member 66, and a single helical spring 68 is positioned between and in contact with the reaction member 48 and the annular flange member 66, the annular flange member 66 being positioned to contact the sleeve piston 44, whereby the sleeve piston 44 and reaction member 48 are urged apart. An auxiliary spring guide sleeve 69 is fixed to the reaction member 48 and is employed to insure positive piloting of the spring 68 and to limit travel of the recoil mechanism. A cable 70 connects cylinder 36 and cylinder 32, to retain the cylinder 36 in its position about the sleeve piston 44 during disassembly of the apparatus, to prevent dirt from entering the cylinder 36 cavity, and to prevent its separation where it would be difficult to retrieve.

In such state, with the chamber 60 substantially filled with substantially incompressible fluid, and the rod member 46 and cylinder 36 extended relative to each other due to the substantial filling of such chamber 60, during reciprocal movement of the first and second members 20,22 in one direction generally toward each other (i.e., the recoil condition), the rod member 46 moves with the member 22, and the cylinder 36 moves with the member 20, so that the rod member 46 is urged further inwardly of the cylinder 36. Pressure buildup in the chamber 60 due to such urging of the rod member 46 inwardly of the cylinder 36 acts on the end face 56 of the sleeve piston 44 (through the annular seal 54). The sleeve piston 44 will thereby be moved outwardly of the cylinder 36, in a direction relative to the cylinder 36 opposite the movement of the rod member 46 relative to the cylinder 36. Such movement of the sleeve piston 44 in turn moves the annular flange member 66 to compress the helical spring 68, such helical spring 68 actually being compressed between the reaction member 48, which is itself moving rearwardly relative to the vehicle, and the annular flange member 66, which is itself moving forwardly relative to the vehicle. It will thus be seen that the amount of compressing movement of the helical spring 68 is greater than the corresponding amount of relative movement of the members 20,22 in such recoil direction.

Compressing the helical spring 68 from both ends as described permits the use of a smaller, less stiff, and less expensive spring to be used, meanwhile achieving substantially the same impact and load recoil capacity of a larger spring. In this embodiment, the square area of the end 50 of the rod member 46 within cylinder 36 is chosen as the same as the square area of the end face 56 of the sleeve piston 44. With such configuration, as the rod member 46 is moved inwardly of the cylinder 36, the helical spring 68 is compressed from both ends by reaction member 48 and annular flange member 66 an equal amount. It will be understood that these square areas, and other areas involved in the apparatus, can be varied to achieve any desired amount of differential movement as desired.

The overall apparatus is extremely simple in design, and is also simpler in construction than previous designs, with few close tolerances required in order to achieve proper operation.

What is claimed is:

1. In combination with first and second members generally reciprocable so as to be movable in one and the other directions relative to each other, recoil means comprising:

cylinder means associated with the first member and movable therewith upon relative movement between said members in one and the other directions, said cylinder means having an open end;

a sleeve piston disposed within said cylinder means and movable therein;

a rod member disposed within the sleeve piston, and extending inwardly of said cylinder means through said open end of said cylinder means, said cylinder means, rod member and sleeve piston forming a substantially closed chamber in which substantially incompressible fluid may be disposed;

reaction means associated with the second member for movement therewith;

said rod member being movable with said second member inwardly of the cylinder means upon relative movement between said members in the one direction;

compressible and extensible resilient means associated with the sleeve piston and reaction means to urge them apart, whereby, with said chamber substantially filled with substantially incompressible fluid, movement of the rod member with the second member inwardly of the cylinder means, upon relative movement between said members in said one direction, moves the sleeve piston relative to the cylinder means directionally opposite the movement of the rod member relative to the cylinder means, whereby, upon said relative movement of said first and second members in said one direction, the amount of compressing movement of the resilient means is greater than the corresponding amount of relative movement of the first and second members in said one direction.

2. The combination of claim 1 and further comprising a single annular seal member disposed about the rod member and within the cylinder means for providing sealing between the rod member and cylinder means.

3. The combination of claim 2 wherein the annular seal contacts the annular end face of the sleeve piston.

4. The combination of claim 1 wherein said resilient means comprise a single helical spring.

5. The combination of claim 4 and further comprising an annular flange member, said helical spring being positioned between and in contact with said reaction means and said annular flange member, said annular flange member being positioned to contact said sleeve piston, whereby said sleeve piston and reaction means are urged apart.

6. The combination of claim 5 wherein said rod member is positioned through an aperture in said annular flange member.

7. The combination of claim 6 wherein said rod member extends through and from said sleeve piston.

8. The combination of claim 1 wherein said rod member extends through and from said sleeve piston.

9. The combination of claim 1 and further comprising means through which pressure may be released from the chamber, and positioned elevationally above said chamber.

* * * * *